(12) United States Patent
Golowich et al.

(10) Patent No.: US 6,574,403 B1
(45) Date of Patent: Jun. 3, 2003

(54) APPARATUS AND METHOD FOR IMPROVING BANDWIDTH OF MULTIMODE OPTICAL FIBERS

(75) Inventors: Steven Eugene Golowich, New Providence, NJ (US); Sean L Jones, Clarkston, GA (US); Albert John Ritger, Lawrenceville, GA (US); K Scott Thornburg, Jr., Tucker, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/575,867

(22) Filed: May 17, 2000

(51) Int. Cl.[7] ............................. G02B 6/02; G02B 6/16
(52) U.S. Cl. ....................................... 385/123; 385/27
(58) Field of Search ............................... 385/123, 124, 385/27, 28

(56) References Cited

U.S. PATENT DOCUMENTS

| | | | |
|---|---|---|---|
| 4,286,979 A | 9/1981 | Buckler | 65/3 A |
| 4,339,174 A | 7/1982 | Levin | 350/96.31 |
| 5,940,567 A | 8/1999 | Garito | 385/127 |
| 6,154,589 A | * 11/2000 | Kirk et al. | 385/29 |

OTHER PUBLICATIONS

Crisp, J. Introduction to Fiber Optics. Oxford, 1996. pp. 61–62.*

D. Marcuse , "*Calculation of bandwidth from index profiles of optical fiber. 1: Theory;*" Jun. 15, 1979; Applied Optics; vol. 18, No. 12; pp. 2073–2080.

* cited by examiner

Primary Examiner—Mark A. Robinson
Assistant Examiner—Alessandro V. Amari
(74) Attorney, Agent, or Firm—John M. Harman

(57) ABSTRACT

Embodiments of the invention include an optical communications system including a multimode optical fiber having improved overfill-launch bandwidth performance without disturbing existing laser-launch bandwidth performance. The multimode optical fiber has a characteristic differential mode delay with a first portion associated with lower order modes that behaves conventionally and a second portion associated with higher order modes that deviates from conventional behavior in a way that improves overfill-launch bandwidth performance at one operating window without adversely impacting the laser-launch bandwidth performance at the same and other operating windows. Multimode optical fibers conventionally optimized for operation at 850 nm are configured in such a way that their characteristic differential mode delay, at 1300 nm, initially increases in a conventional manner and then flattens out to approximately zero at the higher order modes. At 850 nm, the characteristic differential mode delay initially remains flat at approximately zero, in a conventional manner, and then decreases at the higher order modes. Also, embodiments of the invention include an inventive optical fiber preform configured appropriately to produce the desired differential mode delay, and a method for making the inventive optical fiber preform.

5 Claims, 4 Drawing Sheets

INDEX DIFFERENCE

1300 DELAYS

APPARATUS AND METHOD FOR IMPROVING BANDWIDTH OF MULTIMODE OPTICAL FIBERS

BACKGROUND OF THE INVENTION

1. Field of the Invention

The invention relates to multimode optical fibers. More particularly, the invention relates to multimode optical fibers having improved bandwidth and differential mode delay characteristics.

2. Description of the Related Art

The bandwidth of optical fibers, including multimode optical fibers, relates generally to the amount of information the optical fiber transmits per given unit of time. In the frequency domain, bandwidth is defined as the frequency at which the response of the optical fiber (under a particular set of launch condition parameters) is 3 decibels (dB) down from the response of the optical fiber when the modulating frequency is zero or approximately zero. In the frequency domain, bandwidth is measured directly in units of megahertz (MHz), multiplied by the fiber's length in kilometers (km) and expressed in units of MHz-km.

A major factor affecting the bandwidth of a multimode fiber is the particular shape of the refractive index distribution of the optical fiber's core with respect to a theoretically perfect index profile. In multimode optical fibers, lower order modes are transmitted closer to the center of the fiber and higher order modes typically travel along longer paths that oscillate back and forth between the center of the fiber core and the core/cladding boundary. Because the lower order modes have a shorter path of travel than higher order modes and thus travel through a multimode fiber sooner, the refractive index of a multimode optical fiber typically is configured to decrease gradually when moving radially outward from the core center to the core/cladding boundary. The gradually decreasing refractive index slows down the travel speed of the lower order modes relative to the higher order modes. The decrease in refractive index should coincide with the gradual increase in travel time of the higher order modes so that, desirably, all the modes arrive at the far end of the multimode optical fiber at the same time, in which case mode dispersion is minimized.

The refractive index of such a fiber, known as graded-index fiber, is given as $$n(r)=n(o)[1-2\Delta(r/a)^\alpha]^{1/2}$$

where r is radial distance from the fiber axis, a is the core radius, n(o) is the index maximum, $\Delta$ is the relative index difference between the core and the cladding, and $\alpha$ is a power law exponent that characterizes the profile shape. An optical fiber having a refractive index profile generally along the shape of a graded-index fiber typically is said to have an alpha profile or $\alpha$-profile.

Because of the relationship between an optical fiber's bandwidth and change in refractive index profile, the ability to predict the bandwidth of a multimode optical fiber based on its index profile has long been a desire. However, relatively small changes in refractive index profiles often generate relatively large effects on multimode optical fiber bandwidth. Therefore, the bandwidth and other characteristics of multimode optical fibers often are characterized instead in terms of their differential mode delay. Differential mode delay refers to the differential or relative time required for various modes within a multimode optical fiber to travel a certain distance.

Other factors that affect bandwidth of a multimode optical fiber include the inherent change in refractive index as a function of wavelength, which causes different wavelengths to travel at different speeds through the optical fiber. Thus, the index profile for improving the bandwidth of the optical fiber at one wavelength differs from the index profile needed to improve the bandwidth of the optical fiber at another wavelength.

Because of these factors and other effects, conventional optical fibers often are configured for optimal bandwidth performance at various operating windows, e.g., the 850 nanometer (nm) window, which coincides with the operating frequency of many early conventional light emitting diode (LED) optical sources and detectors, or the 1300 nm window, which coincides with the operating frequency of many conventional laser sources. Also, it is possible to configure optical fibers for optimal bandwidth performance at other conventional operating windows. It should be remembered that, because of the factors discussed hereinabove, the transmission characteristics of an optical fiber optimized for operation at the 850 nm window are much different and less optimal when the optical fiber is operating in, e.g., the 1300 nm window.

Many conventional applications have evolved around an optical fiber standard performance of 200 MHz-km bandwidth at the 850 nm operating window and 500 MHz-km bandwidth at the 1300 nm operating bandwidth, with the bandwidth being measured using overfill-launch conditions. An overfilled launch attempts to excite all modes, and typically is performed using a LED or other suitable source. The overfilled launch is compared with, e.g., a restricted launch or laser-launch, which attempts to excite one or more specific modes using, e.g., a laser source.

Recent developments have focused on systems employing optical fiber with higher bandwidth capabilities that still perform well under older performance conditions. For example, it is desirable to have available optical fibers configured for optimal laser-launch performance at the 850 nm operating window that also have improved overfill-launch bandwidth at 1300 nm operating window. Similarly, it is desirable to have available optical fibers configured for optimal laser-launch performance at 1300 nm that also have improved overfill-launch bandwidth at the 850 nm operating window.

SUMMARY OF THE INVENTION

The invention is embodied in an optical communications system including a multimode optical fiber having improved overfill-launch bandwidth performance without disturbing existing laser-launch bandwidth performance. Embodiments of the invention provide a multimode optical fiber having a characteristic differential mode delay with a first portion associated with lower order modes that behaves conventionally and a second portion associated with higher order modes that deviates from conventional behavior in a way that improves overfill-launch bandwidth performance at one operating window without adversely impacting the laser-launch bandwidth performance at the same and other operating windows. In one embodiment, a multimode optical fiber conventionally optimized for operation at 850 nm is configured or otherwise modified in such a way that, when operating at 1300 nm, the differential mode delay initially increases in a conventional manner and then flattens out to approximately zero (0) for the higher order modes. Also, at 850 nm, the differential mode delay of the multimode optical fiber initially remains flat at approximately zero, in a conventional manner, and then decreases at the higher order modes. However, such decrease does not adversely affect bandwidth performance of laser-launches into predominantly low-order modes because the lower order modes rather than the higher order modes are more important to bandwidth performance.

Alternatively, according to embodiments of the invention, a multimode optical fiber conventionally optimized for operation at 1300 nm is configured to have a differential mode delay that, when operating at 850 nm, initially decreases in a conventional manner at the lower order modes and then flattens out to approximately zero at the higher order modes. When operating at approximately 1300 nm, the differential mode delay begins flat at approximately zero with the lower order modes and then increases slightly at the higher order modes.

Embodiments of the invention include an inventive optical fiber preform and a method for making the optical fiber preform. The inventive preform includes a core region configured to have a refractive index with the characteristic differential mode delay just described, and a cladding region surrounding the core region with a refractive index lower than the refractive index of the core region. The method for making the preform includes providing a core region having a refractive index that will produce an optical fiber having the desired characteristic differential mode delay, and forming a cladding region around the core region. Alternatively, the method for making the preform includes the step of modifying the refractive index of a conventional core region in such a way that the optical fiber formed from the preform has characteristic differential mode delay plots that behave in the desired manner described hereinabove.

DETAILED DESCRIPTION

Figure 1:
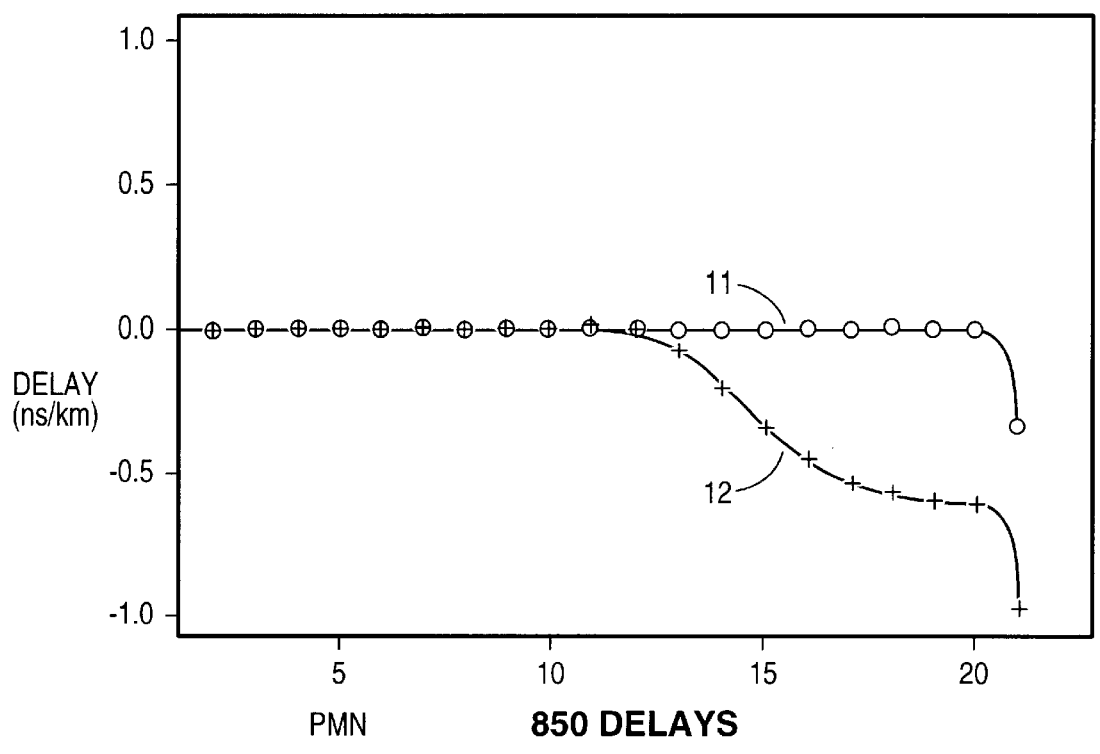
FIG. 1 is a graphical diagram illustrating the differential mode delay time of a conventional optical fiber optimized for operation at approximately 850 nanometers (nm) and an optical fiber otherwise optimized for operation at approximately 850 nm having differential mode delay characteristics according to embodiments of the invention, for an operating window of approximately 850 nm.

Although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Embodiments of the invention are based on the realization that optical fibers are capable of performing well at more than one operating window when the bandwidth characteristics of the optical fibers are configured for increased overfill-launch bandwidth performance at one operating window without adversely affecting the laser-launch bandwidth performance at the same or other operating windows. For purposes of discussion in this description, the term "window" or "operating window" refers to an operating wavelength region of an optical fiber. Based upon the inherent loss characteristics of a conventional optical fiber as a function of frequency, operating windows exist, e.g., at approximately 850 nanometers (nm), approximately 1300 nm and approximately 1550 nm.

It has been shown that, under laser-launch conditions, lower order modes are more important than higher order modes to bandwidth performance of an optical fiber. See, e.g., co-pending applications Serial No. 60/124293 ("Propagation and Detection of Fiber Faults In 10 Gb MUX"), which was filed Mar. 12, 1999 and assigned to the assignee of the present invention, and Serial No. 60/130413 ("High-Speed Multi-Mode Fiber-Optic Link"), which was filed Apr. 21, 1999 and assigned to the assignee of the present invention. Laser-launch conditions (also referred to as restricted launch conditions) exist when a laser source attempts to excite one or more specific modes in an optical fiber.

By comparison, under overfill-launch conditions, although both lower order modes and higher order modes are important to bandwidth performance of the optical fiber, higher order modes more strongly influence the bandwidth performance. As discussed previously hereinabove, overfill-launch conditions exist when a light emitting diode (LED) or other suitable source attempts to excite most or all of the modes within the fiber.

According to embodiments of the invention, the transmission properties of an optical fiber are configured in such a way that the differential mode delay characteristics of the optical fiber deviate properly in sign and magnitude to increase the effect of higher order modes on overfill-launch bandwidth performance at one operating window without adversely affecting the effect of the lower order modes on laser-launch bandwidth performance at the same or other operating windows. For example, according to an embodiment of the invention, the transmission properties of an optical fiber otherwise configured for optimal bandwidth performance at, e.g., the 850 nm operating window, are modified in such a way that the differential mode delay characteristics are indicative of improved overfill-launch bandwidth performance at, e.g., 1300 nm operating window, without adversely affecting the laser-launch bandwidth performance at the 850 nm operating window or the 1300 nm operating window.

Optical fibers are configured according to embodiments of the invention, e.g., by varying the refractive index profile as compared to conventional refractive index profiles, or by some other suitable manner. Optical fibers according to embodiments of the invention are characterized by a differential mode delay scheme having a first or lower set of modes that behave conventionally and a second or higher set of modes whose delay characteristics deviate from conventional delays for such modes.

Figure 2:
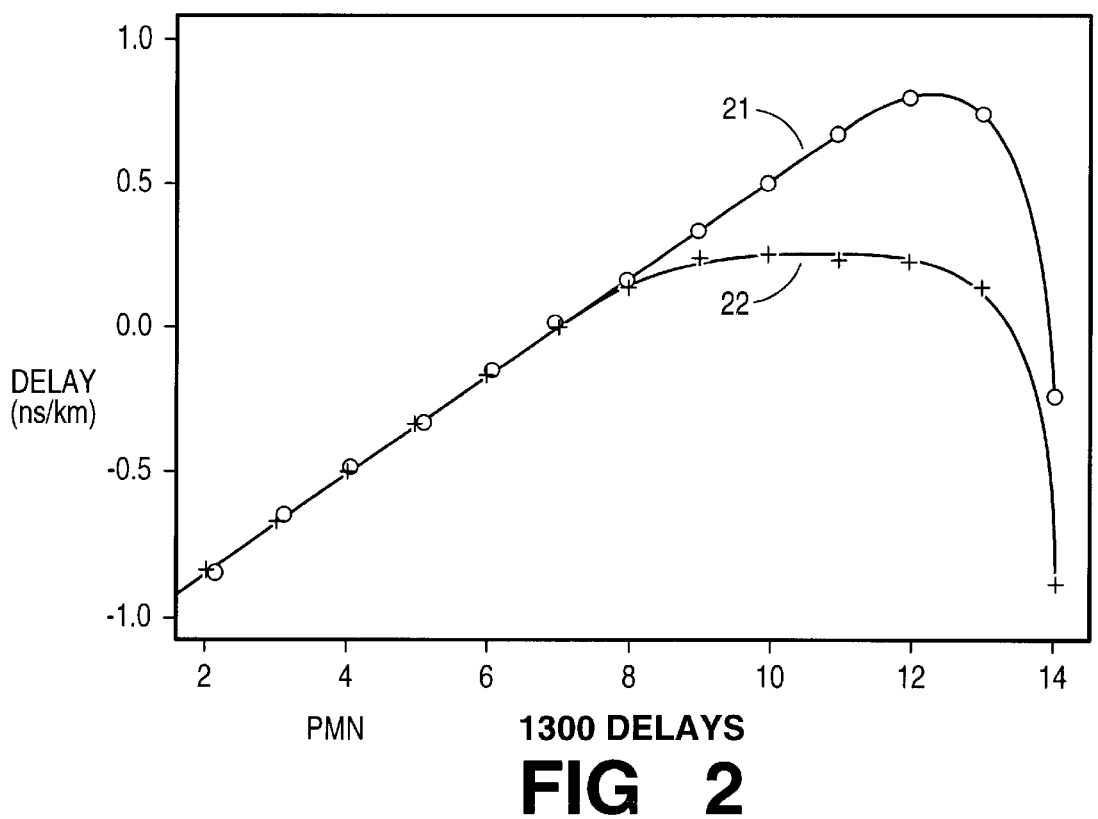
FIG. 2 is a graphical diagram illustrating the differential mode delay time of a conventional optical fiber optimized for operation at approximately 850 nm and an optical fiber otherwise optimized for operation at approximately 850 nm having differential mode delay characteristics according to embodiments of the invention, for an operating window of approximately 1300 nm.

Referring now to FIGS. 1–2, shown are graphical diagrams and corresponding calculated diagrams illustrating the characteristic differential mode delay of an optical fiber with a conventional alpha refractive index profile and the characteristic differential mode delay of an optical fiber having differential mode delay characteristics according to embodiments of the invention. FIG. 1 illustrates characteristic differential mode delays of a conventional fiber (shown as circles 11) and of an inventive fiber (shown as crosses 12) when operating at approximately 850 nm (i.e., when using a source operating at approximately 850 nm). FIG. 2 illustrates the characteristic differential mode delays of the same conventional fiber (shown as circles 21) and the same inventive fiber (shown as crosses 22) when operating at approximately 1300 nm. Conventionally, differential mode delay refers to the differential or relative time required for various modes within a multimode optical fiber to travel a certain distance. The differential mode delay typically is measured in nanoseconds per kilometer of optical fiber and plotted as a function of principal mode number (PMN).

The conventional optical fiber whose characteristic differential mode delay is shown in FIGS. 1 and 2 is configured, e.g., by varying its refractive index profile, for optimal or enhanced bandwidth performance at or near the 850 nm operating window. In this manner, the graded refractive index of the conventional fiber is such that the highest bandwidth theoretically is achieved when operating at 850 nm. Accordingly, when operating at 850 nm (FIG. 1), the differential mode delay plot 11 conventionally is approximately zero throughout the useful range of PMNs (the most remote modes exist at the core/cladding boundary of the optical fiber and thus do not propagate). That is, for PMNs 1–20, there is no measurable delay difference between any of the modes relative to their preceding mode.

However, because the optimal refractive index profile of an optical fiber typically changes with wavelength (due to effects including material dispersion), the bandwidth of an optical fiber essentially is optimized only at one wavelength (i.e., the peak wavelength). Thus, as shown in FIG. 2, the differential mode delay plot 21 of the same conventional optical fiber (configured for optimal performance at 850 nm) operating at approximately 1300 nm is approximately linear but increases slightly with a constant but positive slope as the PMN increases. For example, the differential mode delay varies from approximately −0.80 for PMN=2 to approximately 0.50 for PMN=11. This less than optimal behavior is caused by material dispersion and other effects and is an inherent feature of an optical fiber optimized at one window (e.g., 850 nm) but operating at another window (e.g., 1300 nm). Accordingly, when operating at 1300 nm, for the optical fiber conventionally configured for optimal performance at 850 nm, the relative delay of the higher order modes is slightly larger than the relative delay of the lower order modes.

According to embodiments of the invention, the transmission properties of an optical fiber are configured or modified with respect to that of conventional optical fibers in such a way that the differential mode delay of the inventive optical fiber has a first portion or set of modes that is characteristically conventional and a second portion or set of modes that deviates from conventional differential mode delay behavior. As will be discussed in greater detail hereinbelow, the direction and magnitude of the deviation depends on the operating window and on which conventional transmission properties the inventive fiber was based on. That is, the magnitude and direction of the deviation from a conventional differential mode delay plot depends on whether the inventive fiber is being used, e.g., at the 850 nm operating window or the 1300 nm window. Also, the deviation depends on whether the inventive fiber is based on or is a modification of a conventional fiber optimized for operation at, e.g., the 850 nm operating window or the 1300 nm operating window.

More specifically, for a differential mode delay profile that conventionally varies as a function of the PMN, such as the conventional plot 21 shown in FIG. 2, the transmission properties of the inventive optical fiber are configured in such a way that the characteristic differential mode delay plot 22 decreases and flattens out for the higher order modes. That is, the differential mode delay plot 22 has a first set of PMNs (e.g., PMNs 1–12) that behave in a conventional manner (i.e., rise steadily) and a second set of PMNs (e.g., PMNs 13–20) that flatten out to approximately zero. As shown, the slope of the differential mode delay 22 of the second set of PMNs changes, e.g., in this case, from a slope that is substantially positive to one that is approximately zero.

Correspondingly, for a differential mode delay profile that conventionally remains at approximately zero, such as the conventional plot 11 shown in FIG. 1, the transmission properties of the inventive optical fiber are configured in such a way that the differential mode delay plot 12 falls below zero as a finction of the PMN for the higher order modes. More specifically, the differential mode delay plot 12 has a first set of PMNs (e.g., PMNs 1–12) that behave in a conventional manner (i.e., remains at approximately zero) and a second set of PMNs (e.g., PMNs 13–20) that dip negatively below zero. As shown, the slope of the differential mode delay of the second set of PMNs changes from substantially zero to one that is negative.

In this manner, according to embodiments of the invention, when operating the inventive optical fiber at approximately 1300 nm, the differential mode delays of the higher order modes more closely resemble that of a fiber optimized for 1300 nm (i.e., the delays approach zero). Accordingly, the overfill-launch bandwidth performance, which as discussed hereinabove is more strongly influenced by the higher order modes, is improved.

However, when operating at 850 nm, the higher order modes are lower and thus suggest less than optimal poorer performance. But, since bandwidth performance for laser-launch conditions is hardly if at all effected by the behavior of the higher order modes, laser-launch performance at 850 nm essentially is unaffected. Also, as discussed hereinbelow, since bandwidth performance for overfill-launch conditions is limited by other effects, the suggested less than optimal performance has limited if any effect on bandwidth performance under overfill-launch conditions. Thus, according to embodiments of the invention, for an optical fiber conventionally optimized for operation at 850 nm, the inventive configuration or modification to the otherwise conventional transmission properties of such an optical fiber improve the overfill-launch bandwidth performance at the 1300 nm operating window without compromising the laser-launch bandwidth performance at 850 nm.

For example, calculated results have indicated that, for the differential mode delay characteristics discussed hereinabove, overfill-launch bandwidth performance at 1300 nm improved from 384 MHz-km to 615 MHz-km. As expected, overfill-launch bandwidth performance at 850 nm declined from 50500 MHz-km to 650 MHz-km. However, the overfill-launch bandwidth effectively is limited, e.g., by second order effects, to approximately 10000 MHz-km. Thus, in the specific arrangement described hereinabove, a sacrifice of overfill-launch bandwidth performance at 850 nm is exchanged for an almost two-fold increase in overfill bandwidth performance at 1300 nm, without sacrificing laser-launch bandwidth performance at either the 1300 nm operating window or, more importantly, at the 850 nm operating window.

According to embodiments of the invention, optical fibers are manufactured, configured or modified to achieve the desired differential mode delay, e.g., the differential mode delay 22 shown in FIG. 2. Such configurations or modifications include, e.g., altering the index profile of the optical fiber accordingly to achieve the desired differential mode delay behavior. For example, the preform used to make the optical fiber is configured, e.g., in a conventional manner, with an appropriate index profile to achieve the differential mode delay behavior shown.

Figure 3:
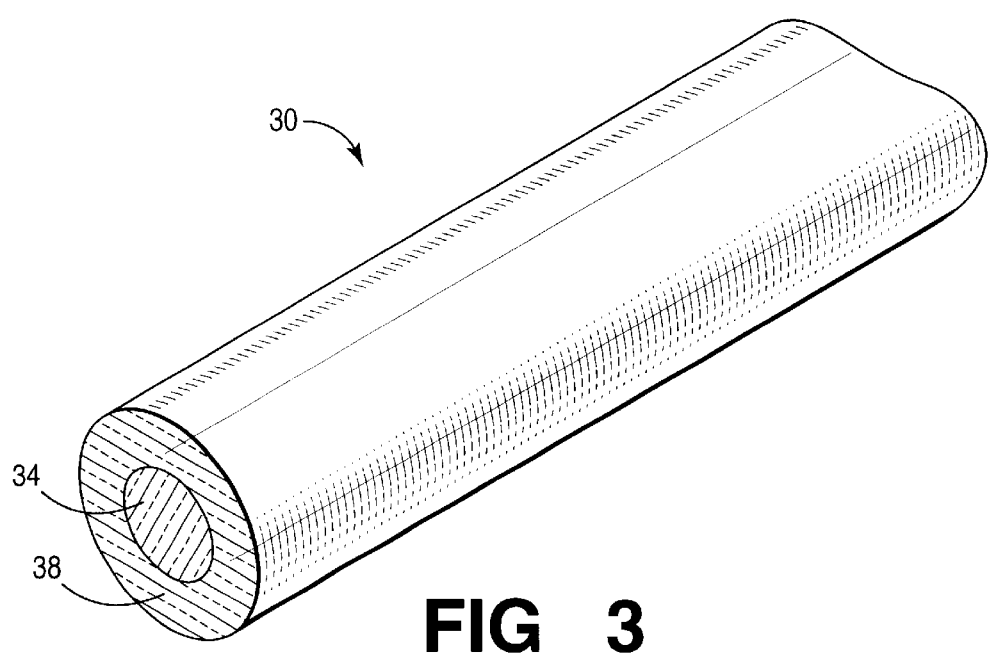
FIG. 3 is a simplified schematic diagram of an optical fiber preform according to embodiments of the invention.

Thus, referring now to FIG. 3, embodiments of the invention also include an optical fiber preform 30 including a core region 34 having a cladding region 38 formed therearound. The preform 30 is configured in such a way that an optical fiber drawn therefrom has a characteristic differential mode delay, e.g., as discussed hereinabove. For example, the refractive index profile of the core region 34 deviates from a conventional profile in such a way as to produce an optical fiber with the characteristic differential mode delay discussed hereinabove. Also, in a conventional manner, the refractive index of the cladding region 38 is lower than that of the core region 34.

Figure 4:
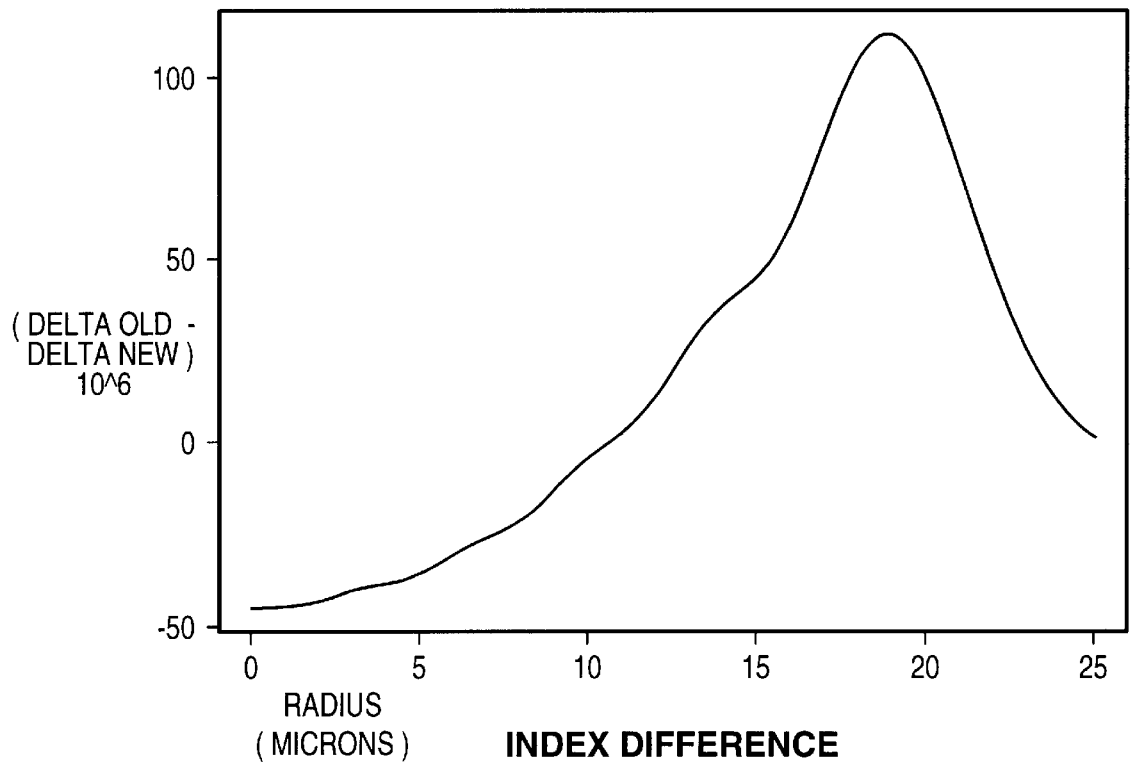
FIG. 4 is a graphical diagram illustrating the difference in refractive index profiles between a theoretically optimal α-profile and a modified α-profile having differential mode delay characteristics as shown in FIGS. 1–2.

Referring to FIG. 4, shown is a graphical diagram illustrating the difference in index profiles between a theoretically optimal α-profile and a profile modified according to embodiments of the invention that produces the differential mode delay characteristics shown in FIGS. 1 and 2. The graph shows the difference in delta (Δ) between the theoretically optimal α-profile and the inventive profile as a function of the radius of the core region. The delta of an optical fiber conventionally is defined as the difference in indices of refraction of the core and the cladding divided by the index of the core. According to embodiments of the invention, the delta difference generally increases as the radius increases, with the greatest difference between approximately 15–20 μm. Above 20 μm, the delta difference generally decreases.

Figure 5:
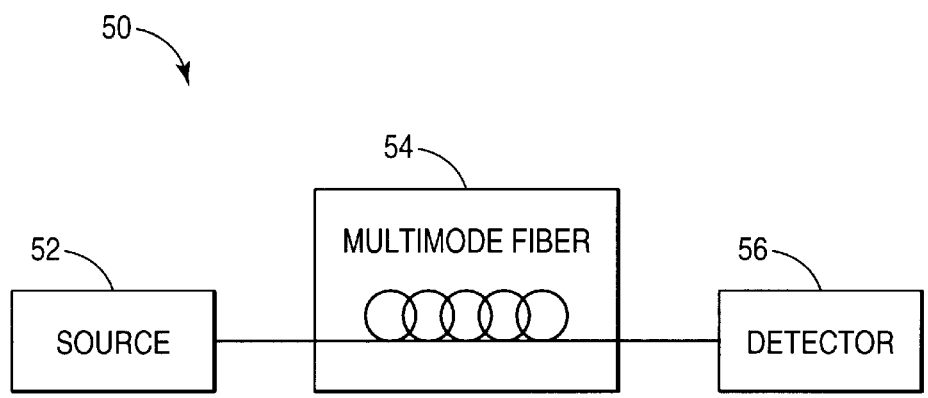
FIG. 5 is a simplified block diagram of an optical communications system according to embodiments of the invention.

Referring now to FIG. 5, a simplified block diagram 50 of an optical communications system according to embodiments of the invention is shown. The optical communications system 50 includes one or more optical sources 52 coupled, e.g., in a conventional manner, to one or more multimode optical fibers 54 having characteristics in accordance with embodiments of the invention, e.g., as discussed hereinabove. The optical fibers 54 are coupled to one or more optical detectors or receivers 56, e.g., in a conventional manner.

Although embodiments of the invention have been described in connection with conventional optical fibers that are optimized for operation at 850 nm, embodiments of the invention also include characteristic differential mode delay variations of conventional optical fibers optimized for operation at other windows, including, e.g., the 1300 nm operating window and the 1550 nm operating window.

Figure 6:
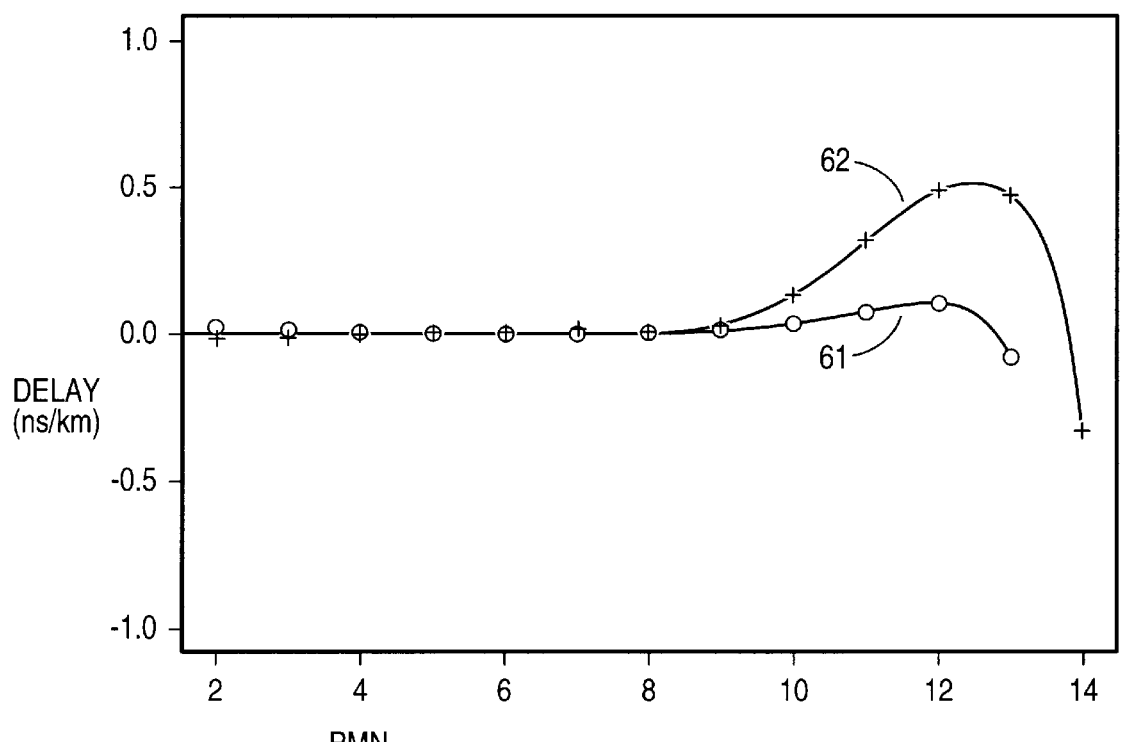
FIG. 6 is a graphical diagram illustrating the differential mode delay time of a conventional optical fiber optimized for operation at approximately 1300 nanometers (nm) and an optical fiber otherwise optimized for operation at approximately 1300 nm having differential mode delay characteristics according to embodiments of the invention, for an operating window of approximately 1300 nm.
Figure 7:
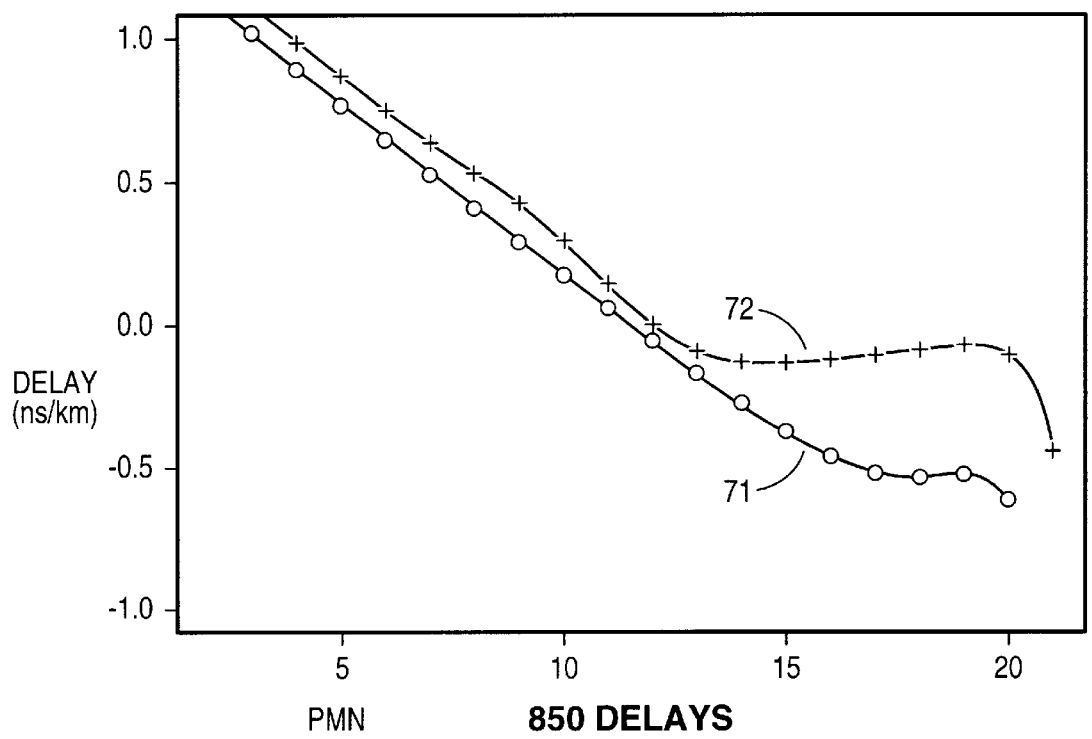
FIG. 7 is a graphical diagram illustrating the differential mode delay time of a conventional optical fiber optimized for operation at approximately 1300 nm and an optical fiber otherwise optimized for operation at approximately 1300 nm having differential mode delay characteristics according to embodiments of the invention, for an operating window of approximately 850 nm.

For example, referring now to FIGS. 6–7, for an optical fiber configured for optimal bandwidth performance at 1300 nm, the characteristic differential mode delay plot (shown as 61 in FIG. 6), when operating at 1300 nm, is approximately zero throughout the useful range of PMNs (e.g., PMNs 1–20). When operating the 1300 nm optimized optical fiber at 850 nm, material dispersion and other effects cause the characteristic differential mode delay plot (shown as 71 in FIG. 7) to gradually decrease with a constant but negative slope as the PMN increases. Thus, the relative delay of the lower order modes is slightly larger than the relative delay of the higher order modes. Such behavior is opposite that of the previously discussed optical fiber optimized for operation at 850 nm but operating at 1300 nm (i.e., the plot 21 shown in FIG. 2).

According to embodiments of the invention, for a 1300 nm optimized optical fiber, embodiments of the invention include configuring the transmission properties of the optical fiber in such a way that the characteristic differential mode delay plot, at 850 nm, conventionally decreases with PMN for lower order modes but then flattens out to approximately zero for PMNs associated with the higher order modes. Thus, as the PMN increases, the slope changes from substantially negative to approximately zero. For example, see the differential mode delay plot 72 shown in FIG. 7.

Correspondingly, at 1300 nm, the differential mode delay plot that conventionally stays approximately zero for the PMNs associated with the lower order modes and the higher order modes up to approximately PMN=20, now begins increasing for PMNs associated with the higher order modes (e.g., PMNs 13–20). In this manner, the slope changes from approximately zero to one that is positive. For example, see the differential mode delay plot 62 shown in FIG. 6.

Thus, when operating at approximately 850 nm, the differential mode delays of the higher order modes more closely resemble that of a fiber optimized for 1300 nm (i.e., the differential mode delays are approximately zero). Accordingly, the overfill-launch bandwidth performance is improved because of the stronger influence of the higher order modes, which behave in a more optimal manner.

When operating at 1300 nm, the higher order modes theoretically perform slightly less optimal, but practical operating limitations render such less than optimal performance moot. Moreover, the laser-launch bandwidth performance, which relies more heavily on the lower order modes than the higher order modes, is essentially unaffected. More specifically, since bandwidth performance for laser-launch conditions is hardly if at all effected by the behavior of the higher order modes, laser-launch performance at 850 nm is essentially unaffected. Thus, according to alternative embodiments of the invention, for an optical fiber conventionally optimized for operation at 1300 nm, the inventive configuration or modification to the otherwise conventional transmission properties of such an optical fiber improve the overfill-launch bandwidth performance at the 850 nm operating window without compromising the laser-launch bandwidth performance at 1300 nm and with slightly less than optimal overfill-launch bandwidth performance at 1300 nm.

Figure 8:
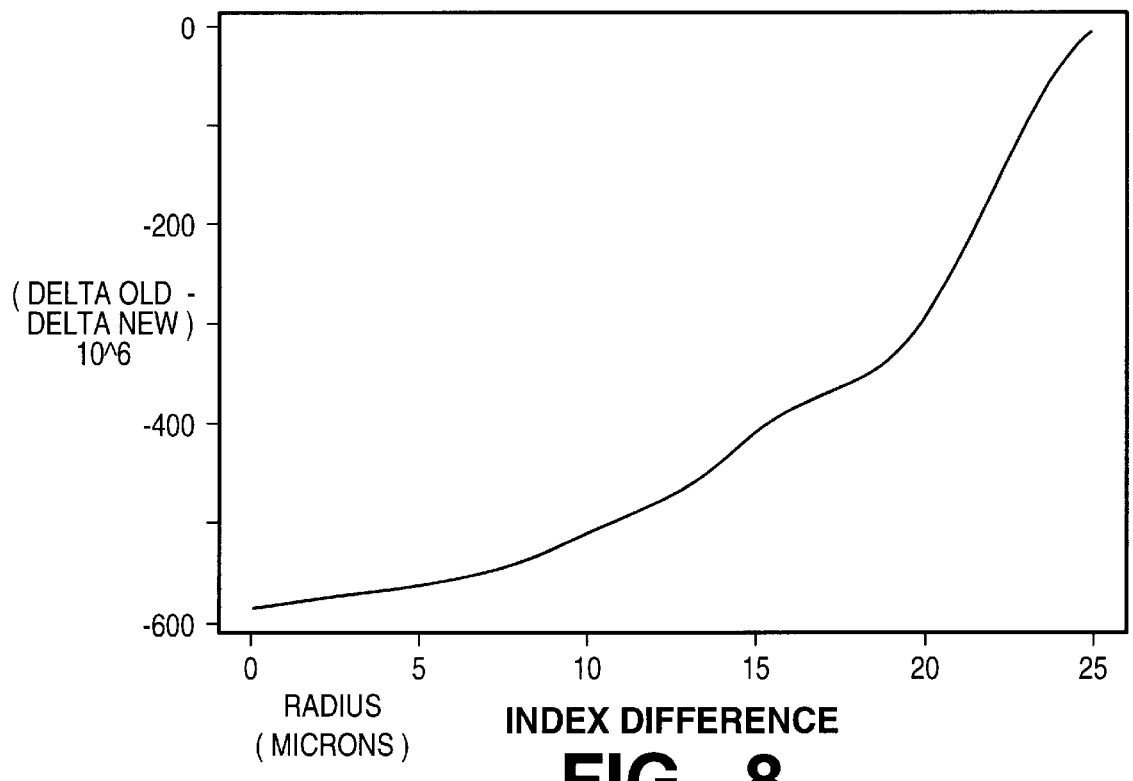
FIG. 8 is a graphical diagram illustrating the difference in refractive index profiles between a theoretically optimal α-profile and a modified α-profile having differential mode delay characteristics as shown in FIGS. 6–7.

Referring to FIG. 8, shown is a graphical diagram illustrating the difference in index profiles between a theoretically optimal α-profile and an α-profile modified according to embodiments of the invention that produces the differential mode delay characteristics shown in FIGS. 6 and 7. The graph shows the difference in delta (Δ) between the theoretically optimal α-profile and the inventive α-profile as a function of the radius of the core region. As discussed previously herein, the delta of an optical fiber conventionally is defined as the difference in indices of refraction of the core and the cladding divided by the index of the core. According to embodiments of the invention, the delta difference generally increases as the radius increases.

It will be apparent to those skilled in the art that many changes and substitutions can be made to the embodiments of the multimode optical fiber apparatus and methods herein described without departing from the spirit and scope of the invention as defined by the appended claims and their full scope of equivalents. For example, it is possible to modify the transmission properties of optical fibers having refractive index profiles other than conventional alpha graded-index profiles. According to embodiments of the invention, the optical fiber transmission property configurations and modifications necessary to generate the desired differential mode delay characteristics also are applicable, e.g., to graded-index multimode fibers having refractive index profiles other than those discussed hereinabove and to step index multimode fibers.

What is claimed is:

1. An optical waveguide system for transmitting optical energy, comprising:

at least one source of optical energy;

at least one multimode optical fiber coupled to the source of optical energy, wherein the optical fiber includes a core region having a characteristic differential mode delay and a cladding region surrounding the core region, wherein the transmission properties of the optical fiber are such that the characteristic differential mode delay of the optical fiber, for a first operating window, is approximately zero for the differential delay modes that correspond to the lower order modes and, for a second operating window that is different from the first operating window, is approximately zero for the differential delay modes that correspond to the higher order modes; and at least one receiver coupled to the multimode optical fiber for receiving optical energy from the source of optical energy.

2. A multimode optical fiber for transmitting optical energy within an optical communications system, comprising:

a core region having a characteristic differential mode delay; and a cladding region surrounding the core region, wherein the characteristic differential mode delay of the core region, for a first operating window, is approximately zero for the differential delay modes that correspond to the lower order modes and, for a second operating window that is different from the first operating window, is approximately zero for the differential delay modes that correspond to the higher order modes.

3. An optical fiber preform, comprising:

a core region having a refractive index with a characteristic differential mode delay; and a cladding region surrounding the core region and having a refractive index lower than the refractive index of the core region, wherein the characteristic differential mode delay of the core region, for a first operating window, is approximately zero for the differential delay modes that correspond to the lower order modes and, for a second operating window that is different from the first operating window, is approximately zero for the differential delay modes that correspond to the higher order modes.

4. A method of making an optical fiber preform, comprising the steps of:

providing a core region having a refractive index; and forming a cladding region around the core region, wherein the refractive index of the core region is configured in such a way that an optical fiber drawn from the preform has a characteristic differential mode delay that, for a first operating window, is approximately zero for the differential delay modes that correspond to the lower order modes and, for a second operating window that is different from the first operating window, is approximately zero for the differential delay modes that correspond to the higher order modes.

5. A method of transmitting optical energy in an optical communications system including a source of optical energy, at least one receiver for receiving optical energy and at least one multimode optical fiber operably coupled to the source and the receiver for transmitting optical energy therebetween, said method comprising the steps of:

providing a multimode optical fiber having transmission properties such that the characteristic differential mode delay of the multimode optical fiber, for a first operating window, is approximately zero for the differential delay modes that correspond to the lower order modes and, for a second operating window that is different from the first operating window, is approximately zero for the differential delay modes that correspond to the higher order modes; and transmitting optical energy from the source to the receiver through the optical fiber, wherein the characteristic differential mode delay of the optical energy transmission medium improves the overfill-launch bandwidth of at least one first operating window without degrading the laser-launch bandwidth of at least one second operating window.

* * * * *